United States Patent [19]

Percival et al.

[11] Patent Number: 4,475,538
[45] Date of Patent: Oct. 9, 1984

[54] WINDOW FOR SOLAR RECEIVER FOR A SOLAR-POWERED HOT GAS ENGINE

[75] Inventors: Worth H. Percival, Oakton; David N. Wells, Arlington, both of Va.

[73] Assignee: United Stirling AB, Malmo, Sweden

[21] Appl. No.: 556,568

[22] Filed: Nov. 30, 1983

[51] Int. Cl.³ .............................................. F24J 3/02
[52] U.S. Cl. .................................... 126/439; 126/441; 126/450
[58] Field of Search ............... 126/417, 438, 439, 440, 126/441, 442, 449, 450; 60/641.8, 641.15

[56] References Cited

U.S. PATENT DOCUMENTS

| | | | |
|---|---|---|---|
| 3,208,447 | 9/1965 | Laszlo | 126/441 |
| 3,841,302 | 10/1974 | Falbel | 126/439 |
| 4,019,496 | 4/1977 | Cummings | 126/441 |
| 4,076,015 | 2/1978 | Mattson | 126/439 |
| 4,078,548 | 3/1978 | Kapany | 126/441 |
| 4,106,479 | 8/1978 | Rogers | 126/439 |
| 4,136,670 | 1/1979 | Davis | 126/441 |
| 4,240,692 | 12/1980 | Winston | 126/438 |
| 4,321,910 | 3/1982 | Devienne | 126/439 |
| 4,345,645 | 8/1982 | Bratt . | |
| 4,356,813 | 11/1982 | Hoffman | 126/439 |
| 4,395,879 | 8/1983 | Berntell . | |
| 4,402,306 | 9/1983 | McElroy | 126/439 |

OTHER PUBLICATIONS

"Dish Stirling Solar Receiver Program Final Report", Doc. No. ER 79917-3, Dec. 15, 1980, Including pp. i–ix, 1–16, Enclosure pp, 1–4 of ER 79917-2 (12/5/80), and Dwg. No. 79917001.
Chubb, "Solar Energy", vol. 23, pp. 217–221, 1979, FIGS. 1 and 2.

*Primary Examiner*—Daniel J. O'Connor
*Attorney, Agent, or Firm*—Finnegan, Henderson, Farabow, Garrett & Dunner

[57] ABSTRACT

The solar receiver for use e.g. with a solar-powered Stirling-type hot gas engine includes an internally mounted fused silica window for sealing the receiver aperture against thermal energy convection losses. The window has a folded cone configuration with an inverted radially outer truncated conical window member, and a radially inner conical window member joined at the base to the smaller base of the outer member. The larger base of the outer conical member is attached to the receiver housing to surround the aperture, and the angle of revolution of both members is about 20°. At least 50% of the solar radiation escaping the receiver through the aperture undergoes at least three reflections prior to escaping.

6 Claims, 1 Drawing Figure

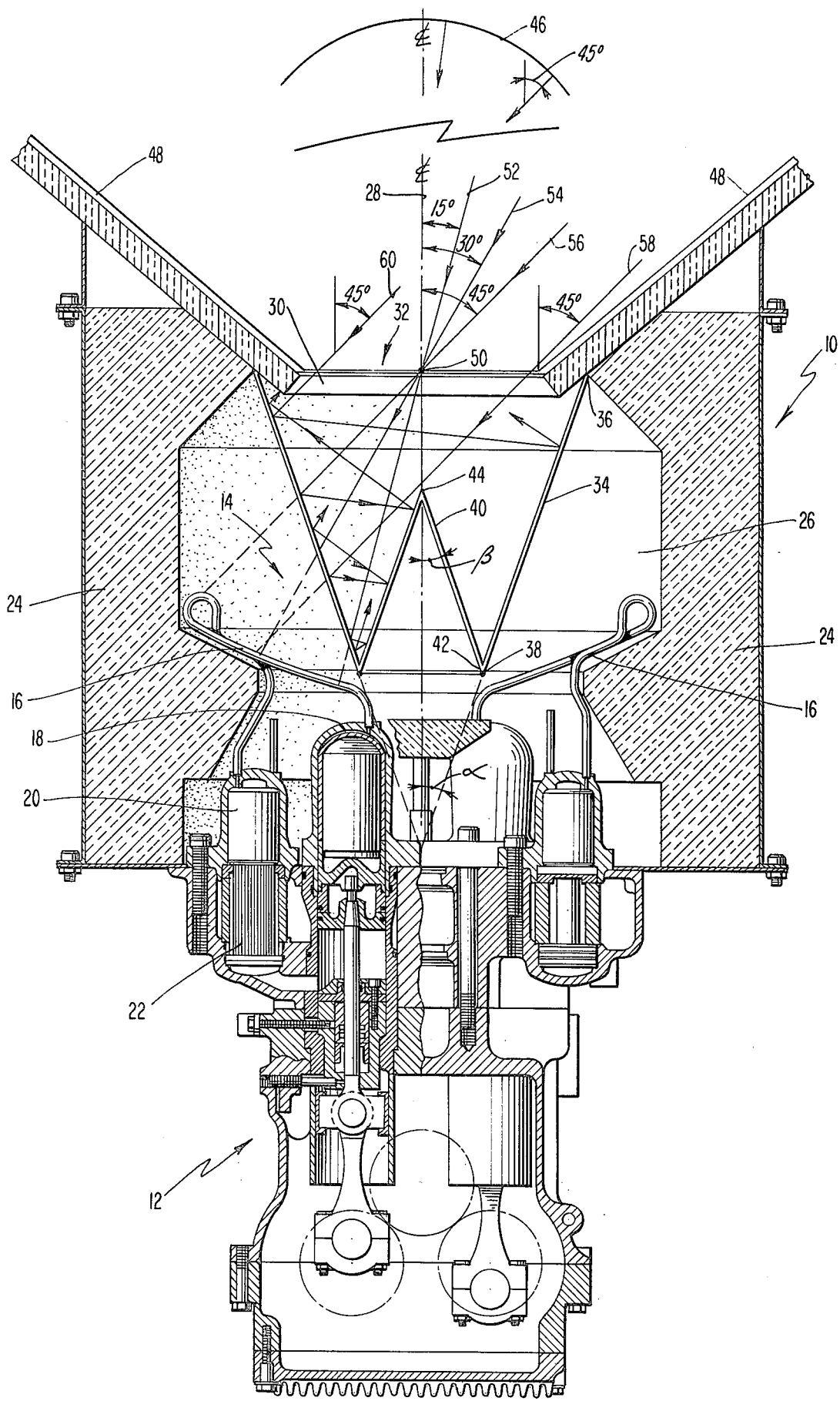

WINDOW FOR SOLAR RECEIVER FOR A SOLAR-POWERED HOT GAS ENGINE

BACKGROUND

1. Field of the Invention

This invention relates to solar receivers for solar-powered hot gas engines.

2. Description of the Prior Art

Solar receivers typically include an insulated housing defining a receiver cavity and an aperture in the housing to admit solar radiation for conversion to thermal (heat) energy inside the cavity, for subsequent utilization such as by a heat engine of the hot gas (Stirling) type.

Significant heat losses may occur from convection effects with open-aperture solar Stirling receivers. For example, for a 22 cm diameter aperture, 20° C. air entering with a velocity of 1 m/s flowing into ⅓ of the aperture heated to 520° C. and flowing out the remaining ⅔ area of aperture will carry away about 7.75 kW of thermal energy. Typical average wind speed of 5 m/s for the U.S. may cause serious problems in reaching current receiver efficiency estimates of 85%.

Quartz (fused silica) windows mounted in the plane of the aperture have been suggested as possibly providing a method of reducing convection losses, as well as heat (infra-red) radiation losses. The FIGURE is a schematic of a solar-powered Stirling hot gas engine having a receiver including an insulated housing surrounding the hot gas engine heater head with a quartz window mounted in the plane of the aperture. A problem with quartz windows, unfortunately, is reflectivity. For instance, baseline 89.2 m² parabolic dish collector-concentrator with 90% reflectance at 0.85 kW/m² insolation would be delivering 68.2 kW of radiant energy to the receiver. For a nominal 10% reflective flat quartz window, the reflectivity would cause a 6.8 kW loss, which would be sacrificed before any gain from saved convection losses would be realized.

It has also been suggested by Francia and, later, by Chubb to use an assembly of transparent, open-ended tubes oriented perpendicular to the aperture plane to fill the aperture of a solar receiver (see e.g. Chubb, "Solar Energy" vol. 23, pp. 217-221, 1979, FIGS. 1 and 2). Solar radiation incident on the ends of the tubes at angles to the tube axes would be reflected down the tube and into the cavity. However, this arrangement suffers from back reflection from the ends of the tubes which can constitute a significant fraction of the aperture planar area. Also, the arrangement does not provide a true barrier against ambient wind and convection currents, and can be complicated and expensive to construct.

SUMMARY OF THE INVENTION

In accordance with the present invention, as embodied and broadly described herein, an improved solar receiver for conversion of solar radiation to thermal energy is provided of the type including a heat exchanger for the transfer of heat out of the receiver, an insulated housing forming a cavity surrounding the heat exchanger, and an aperture in the housing to allow the influx of solar radiation, the housing having an axis centerline of the receiver and the center of the aperture and the center of the heat exchanger both being located on the centerline, wherein the improvement comprises a window for intercepting solar radiation passing through the aperture, the window including an outer window member in the shape of an inverted truncated right circular conical shell and having the shell edge forming the larger cone base positioned adjacent the housing to surround the aperture and having the shell edge forming the smaller cone base extending within the cavity, the axis of revolution of the outer conical shell being colinear with the centerline of the receiver, and an inner window member in the shape of a right circular conical shell positioned within the outer conical shell and having the shell edge forming the inner shell conical base connected to the outershell smaller base edge and having the vertex of the inner conical shell extending toward the aperture, the axis of revolution of the inner conical shell also being colinear with the centerline of the receiver, and wherein the dimensions of the inner and outer conical shell window members are selected in relation to the dimensions of the aperture and cavity to provide an effect which results in a plurality of the reflections remaining within the cavity, the solar radiation initially intercepted but reflected by either of the inner and outer window members being substantially transmitted into the cavity. Preferably, the dimensions of the inner and outer conical shell window members are selected in relation to the dimensions of the aperture and cavity to provide at least three reflections within the cavity for at least 50% of the solar radiation initially intercepted but reflected by either of the inner and outer window members before any reflected solar radiation can pass back through the aperture and escape the receiver.

Preferably, the conical angles of the inner conical shell and the outer conical shell are about equal in magnitude, and the inner and outer conical shell window members are formed from fused silica.

It is also preferred that the solar radiation initially incident on the receiver has been reflected from a parabolic dish-type solar collector-concentrator, the dish providing reflected radiation at angles up to about 45° from the receiver centerline, and wherein the conical angles of the inner and outer conical shells are each about 20°.

The accompanying drawing which is incorporated in, and constitutes a part of, this specification illustrates one embodiment of the invention and, together with the description, serves to explain the principles of the invention.

BRIEF DESCRIPTION OF THE DRAWING

The FIGURE is a schematic view of an improved solar receiver having a window used in conjunction with a hot gas engine and made in accordance with the present invention.

Reference will now be made in detail to the present preferred embodiment of the invention, an example of which is illustrated in the aforesaid drawing.

DESCRIPTION OF THE PREFERRED EMBODIMENT

The FIGURE shows a solar receiver, designated generally by the numeral 10, which is used to convert solar radiation into thermal energy to be utilized, for instance, by a hot gas engine, such as engine 12. Hot gas engine 12 is of the double acting Stirling type wherein a plurality of working gas charges are confined in variable volume chambers between pairs of cylinders having pistons reciprocating out of phase. Engine 12 includes heater head 14 which further includes a plurality of individual heater pipes 16 which carry the working gas charges between a cylinder such as cylinder 18 to a respective regenerator-cooler assembly such as regenerator-cooler assembly 20, 22 and to another cylinder (not shown). Heater head 14 functions as the heat exchanger for receiver 10 to transfer heat out of the receiver and to the working gas charges of engine 12. Heater pipes 16 are arrayed in a conical shape. Detailed descriptions of such heater head assemblies are presented, e.g., in U.S. Pat. Nos. 4,345,645 and 4,395,879.

The improved solar receiver of the present invention is not restricted to use with a hot gas engine, or to use with a hot gas engine of the Stirling type, as other apparatus for utilizing the converted thermal energy can be employed and other engine types (e.g. Rankine, Brayton, etc.) can be used.

As depicted in the FIGURE, receiver 10 includes a generally cylindrical insulated housing 24 surrounding heater head 14 and defining receiver cavity 26 and receiver centerline 28. An aperture such as circular aperture 30 is provided in cylindrical housing 24 at one axial end to admit solar radiation such as from a parabolic dish collector-concentrator (not shown), and heater head 14 is located at the opposite axial end of housing 24. Aperture 3 is shown coaxial with the conical heater head 14 and cylindrical housing 24, and having a diameter smaller than the inside diameter of cylindrical housing 24.

In accordance with the present invention, the improved receiver of this invention is provided with a window for intercepting solar radiation passing through the aperture. The window of this invention specifically includes an outer window member in the shape of an inverted, truncated, conical shell positioned wholly within the receiver cavity. As embodied herein, and with continued reference to the FIGURE, a window designated generally by the numeral 32 is shown completely located within cavity 26 and includes a radially outer window member 34 in the shape of an inverted truncated conical shell with the cone edge 36 forming the larger cone base connected to housing 24 to surround aperture 30. Shell edge 38 which forms the smaller cone base is positioned closely adjacent heater head 14. Cone edge 36 can be attached to housing 24 in a variety of ways all within the capability of one skilled in the art, but the manner of attachment should provide for sealing against thermal energy convection losses out of cavity 26 through the aperture past cone edge 36 and also preferably should accommodate any differences in thermal expansion rates of the window material and the housing and also, preferably, provide some degree of protection for the window against vibration caused by the engine 12 acting through housing 24. For example, a clip-type suspension could be employed with a sealing ring.

Further in accordance with the present invention, the window includes an inner window member in the shape of a conical shell and positioned within the outer conical shell, also wholly within the receiver cavity. As embodied herein, and with continued reference to the FIGURE, window 32 includes a radially inner window member 40 in the shape of a conical shell having cone edge 42 forming the base of the cone and the cone vertex 44. Inner window member 40 is oriented and positioned so that cone edge 42 is connected to the outer conical shell edge 38 with the cone vertex 44 directed toward aperture 30. The smaller base of outer cone member 34 and the base of inner cone member 40 have the same diameter to facilitate the attachment of the respective edges, which attachment also should provide for sealing against thermal energy convection losses and provide the required amount of integrity. Again, such means of attachment, for instance by fusing, the respective members would be within the skill of one working in the art.

An important feature of the window made in accordance with the present invention is that a large fraction of the rays incident on the receiver through aperture 30 from a typical collector-concentrator, such as parabolic dish reflector 46 shown schematically in the FIGURE, and not transmitted to the portion of cavity 26 behind window 32, would undergo at least 3 reflections before passing back through aperture 30 and escaping the receiver. Typical collector-concentrators generally reradiate over about a 90° angle, that is 45° to either side of the dish centerline. Receiver housings often have a conical wall surrounding the aperture, such as aperture cone 48 on housing 24 shown in the FIGURE. In the FIGURE, parabolic dish reflector 46 is shown at a much reduced scale in size and spacing relative to the scale and location of engine 12 and receiver 10.

As embodied herein, radially outer shell 34 of window 32 has a conical angle (angle of revolution) of about 20° (angle $\alpha$ drawn on the dotted extensions of member 34), and radially inner conical shell 40 also has a conical angle of about 20° (angle $\beta$) giving rise to a "folded cone" window. The height of the outer conical member 34 is about 10 inches, and the height of the inner conical member 40 is about 4 inches, while the diameter of aperture 30 is about 8 inches. Fused silica or an equivalent transparent high temperature material (e.g. Vicor, made by the Corning Glass Company) can be used to fabricate window members 34 and 40.

As can be seen from the FIGURE, for a perfect point-focusing collector-concentrator wherein all the rays pass through point 50 in aperture 30, all rays except perhaps the rays normally incident on the vertex 44 of inner window member 40 would undergo at least three reflections before passing back out of aperture 30. This phenomenon is shown schematically by rays 52, 54, and 56 in the FIGURE. At each reflection, a portion of the incident reflected ray is transmitted through the respective window member while a smaller fraction is rereflected. Thus, the fraction of the radiant energy actually lost decreases geometrically with the number of reflections.

For example, the transmission of solar radiation for rays normal to a window surface, and up to about 40° from the normal, is about 90%. For steeper angles, the transmittance becomes lower; at 60° it is about 83%. By providing a window in which the solar radiation undergoes at least three reflections, as illustrated, the losses can be significantly reduced. For three reflections the losses become $(1-0.9)^3 \times 100$, or about 0.1% of the solar radiation incident from the collector-concentrator.

However, actual parabolic dish collector-concentrator systems rarely achieve perfect point-focusing due to a number of reasons, including small distortions in the parabolic reflecting surface, specular reflections from an imperfect reflecting surface, etc. This imperfect focusing can cause rays emanating from a portion of the parabolic reflector 46 to enter cavity 26 near the edges of aperture 30. In the FIGURE, rays 58 and 60 are presented to illustrate this phenomenon, showing rays emanating from the outer 45° portion of parabolic reflector 46. As depicted schematically in the FIGURE, the window of the present invention provides for three reflections of ray 58 but ray 60 is reflected only twice before passing back through aperture 30.

In the improved receiver shown in the FIGURE, the dimensions of outer conical shell 34 and inner conical shell 40 are chosen so that inner conical shell vertex 44 is just below the most oblique incoming ray (ray 58), and so that the cone edges 38 and 42 are adjacent heater head 14 with a clearance sufficient to prevent vibration damage.

The window of the present invention thus cannot insure a triple reflection of all the incoming solar radiation, as a small fraction of the incoming radiation will undergo only two reflections before passing out of the receiver. However, it is believed that well over 50% of the radiation passing back through aperture 30 and escaping the receiver will have undergone at least three reflections prior to its escape. Consequently, the receiver of the present invention having the window as described above should result in significant increases in the overall receiver efficiency over conventional solar receivers.

It will be apparent to those skilled in the art that various modifications and variations can be made in the improved solar receivers of the present invention without departing from the scope or spirit of the present invention.

What is claimed is:

1. An improved solar receiver for conversion of solar radiation to thermal energy of the type including a heat exchanger for the transfer of heat out of the receiver, an insulated housing forming cavity surrounding the heat exchanger and an aperture in the housing to allow the influx of solar radiation, the housing having an axis constituting the centerline of the receiver and the center of the aperture and the center of the heat exchanger both being located on the centerline, the improvement comprising
   a window for intercepting solar radiation passing through the aperture, said window including
   (i) an outer window member in the shape of an inverted truncated conical shell and having the shell edge forming the larger cone base positioned adjacent the housing to surround the aperture and having the shell edge forming the smaller cone base extending within the cavity, the axis of revolution of said outer conical shell being colinear with the centerline of the receiver, and
   (ii) an inner window member in the shape of a conical shell positioned within said outer conical shell and having the shell edge forming the inner shell conical base connected to the outer shell smaller base edge and having the vertex of the inner conical shell extending toward the aperture, the axis of revolution of said inner conical shell also being colinear with the centerline of the receiver, and
   wherein the dimensions of said inner and outer conical shell window members are selected in relation to the dimensions of the aperture and cavity to provide at least three reflections within the cavity for at least 50% of the solar radiation initially intercepted but reflected by either of said inner and outer window members before any reflected solar radiation can pass back through the aperture and escape the receiver.

2. The improved solar receiver as in claim 1 wherein the conical angles of said inner conical shell window member and said outer conical shell window member are about equal in magnitude.

3. The improved solar receiver as in claim 2 wherein the conical angles of said inner conical shell and said outer conical shell are about 20°.

4. The improved solar receiver as in claim 1 wherein said inner and outer conical shell window members are formed from transparent fused silica.

5. The improved solar receiver as in claim 1 wherein the dimensions of said inner conical shell window member are such that the cone vertex lies just below the path of the most oblique solar ray passing through the aperture, relative to the receiver centerline.

6. The improved solar receiver as in claim 1 wherein the solar radiation initially incident on the receiver has been reflected from a parabolic dish-type collector-concentrator, the dish providing reflected radiation at angles up to about 45° from the receiver centerline; the conical angles of said inner and outer conical shell window members are each about 20°; the heights of said inner and outer conical shell window members are about 10 inches and 4 inches, respectively; and the diameter of the aperture is about 8 inches.

* * * * *